United States Patent [19]

Wendt

[11] Patent Number: 4,787,767

[45] Date of Patent: Nov. 29, 1988

[54] STUD CLIP FOR THE TOP RAIL OF A PARTITION

[75] Inventor: Alan C. Wendt, Barrington, Ill.

[73] Assignee: USG Interiors, Inc., Chicago, Ill.

[21] Appl. No.: 188,722

[22] Filed: Apr. 29, 1988

Related U.S. Application Data

[63] Continuation of Ser. No. 30,172, Mar. 25, 1987, abandoned.

[51] Int. Cl.$^4$ ................................................. F16B 7/08
[52] U.S. Cl. .................................... 403/187; 403/353; 52/241; 52/243; 52/710; 52/715
[58] Field of Search .................... 403/187, 199, 353; 52/241, 243, 710, 715

[56] References Cited

U.S. PATENT DOCUMENTS

| | | |
|---|---|---|
| 3,319,983 | 5/1967 | Zibell . |
| 3,461,637 | 8/1969 | Jansson ............................. 52/718.1 |
| 3,494,646 | 2/1970 | Cumber . |
| 3,589,525 | 6/1971 | Allen ................................. 403/353 X |
| 3,897,668 | 8/1975 | McDonnell ....................... 52/241 X |
| 4,263,952 | 4/1981 | Kowalski .......................... 52/710 X |
| 4,459,790 | 7/1984 | Vermillion ........................ 52/241 X |

FOREIGN PATENT DOCUMENTS 782428   9/1957   United Kingdom ............... 403/187

OTHER PUBLICATIONS

Marine Bulkhead System Brochure, Donn Corporation, 1985, pp. 3-4.

Primary Examiner—Thomas F. Callaghan
Attorney, Agent, or Firm—Robert M. Didrick; Robert H. Robinson

[57] ABSTRACT

The twisting of studs within the ceiling and floor rails of a partition is prevented by a quickly installable stud clip which may be moved along the rail to its desired position before being fastened to the rail and stud.

The channel form top rail in this system has a pair of longitudinal slots just below the web which are defined by inwardly extending longitudinal tracks which are parallel to the web. The stud clip has a base plate from whose central portion a stud-engaging standard depends at a right angle. On the lateral portions of the plate there are skid elements which fit into the slots and engage the tracks. Extending from one lateral portion of the plate beyond the plane of the standard is a relatively narrow locking tab which is in edgewise abutment with a track. The abutment of the locking tab with the track prevents rotation of the stud clip within the rail.

12 Claims, 3 Drawing Sheets

STUD CLIP FOR THE TOP RAIL OF A PARTITION

This is a continuation of co-pending application Ser. No. 030,172, filed on Mar. 25, 1987, now abandoned.

This invention relates to a system for the quick placement and fastening of metal studs to a ceiling channel in the course of construction of a partition. It relates particularly to a stud clip which may be twisted into place on the channel so that it hangs from tracks spaced apart from and parallel to the web of the channel.

In the construction of a demountable wall with wallboard panels, it is conventional to secure elongate channel members to the floor and ceiling to provide panel retaining rails. In one increasingly popular system, kerfed-edge panels and kerf engaging studs are sequentially installed along the rails. All of the studs may be of the same length even though the distance between the floor and ceiling is not constant from one end of the partition to the other. The labor intensive cutting of individual studs to varying lengths may be omitted because the studs may stop as much as 3 inches short of both the ceiling and the floor rail. The studs act as stiffeners for the array of panels and, except for special use studs, they are not intended to be load supporting.

The height of walls in which the studs are not supporting members is rather limited, however, and in certain geographical areas the increased resistance to earthquakes afforded by fully attached studs would be desirable. The framing of openings in the wall, in any case, requires the attachment of vertical supporting studs to both the ceiling and the floor rails.

A stud extension such as that formerly sold by Donn Corporation and now by USG Interiors, Inc. as Part No. 102030 would be useful in the attachment of supporting studs to the floor and ceiling rails of a demountable wall. The stud extension has the shape of an elongated, inverted L. The upright leg is channel shaped and it fits between the flanges of an H-stud or a C-stud or the like. The cross leg is a plate with downturned edges which is jammed in between the flanges of a ceiling channel so that frictional engagement retains the plate in place.

It is an object of this invention to provide a stud clip which, after being inserted between the flanges of a ceiling rail, may be easily moved longitudinally along the rail to a desired spot.

It is another object of this invention to provide a stud clip which is slidable longitudinally within a ceiling rail but cannot be twisted therein by torsional forces acting on a stud which is connected to the ceiling rail by the stud clip.

It is a related object of this invention to provide a system for the quick installation of load bearing studs which do not, themselves, span the full distance between the floor and ceiling rails of a partition.

It is a further object of this invention to provide a system whereby an array of sequentially installed wallboard panels and "floating" stiffener studs is sandwiched between stiffener studs which are attached to floor and ceiling rails by stud clips and thus prevent separation of the panels and "floating" studs in the event that some panels drop out of the ceiling rail during a minor earthquake.

These and other objects of the invention which will become apparent from the following description are achieved by the clip and system illustrated by the attached drawings and described with reference thereto.

Figure 1:
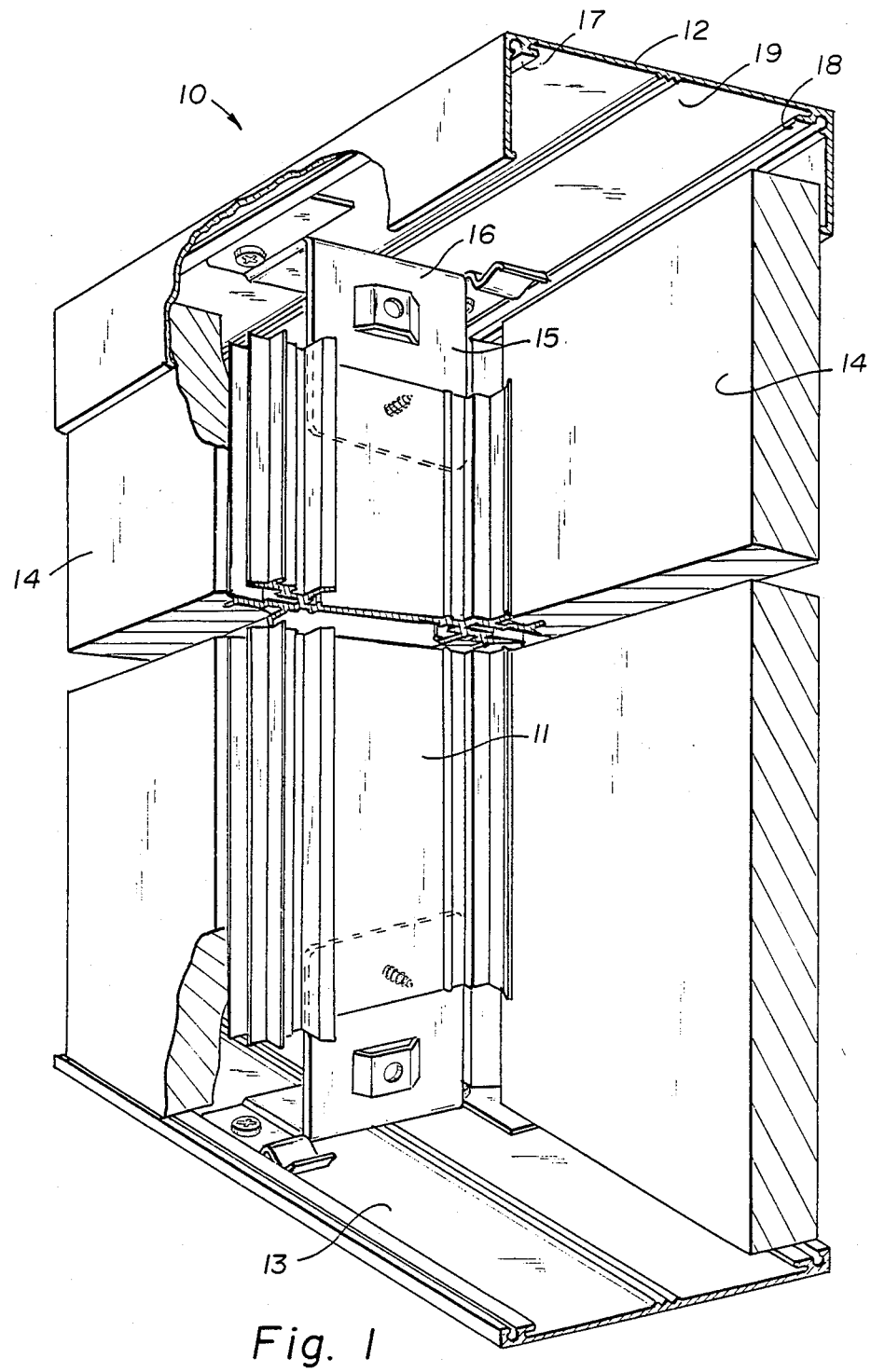
FIG. 1 is a perspective view, partly broken away, of the partition system of this invention.

In FIG. 1, the partition 10 comprises the stud 11 mounted between the channel-form top rail 12 and the floor runner 13, and an array of the gypsum wallboards 14. The stud 11 is connected to the top rail 12 by the standard 15 of the stud clip 16 which rides on the tracks 17 and 18 of the rail which run parallel to the serrated web 19.

Figure 2:
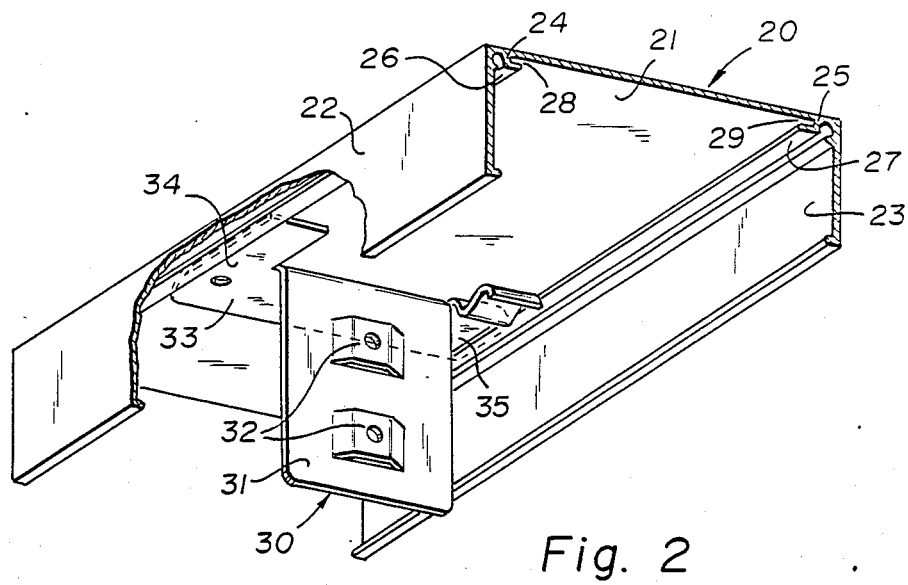
FIG. 2 is a perspective view, looking from below and partly broken away of a stud clip of this invention in combination with a top rail.
Figure 3:
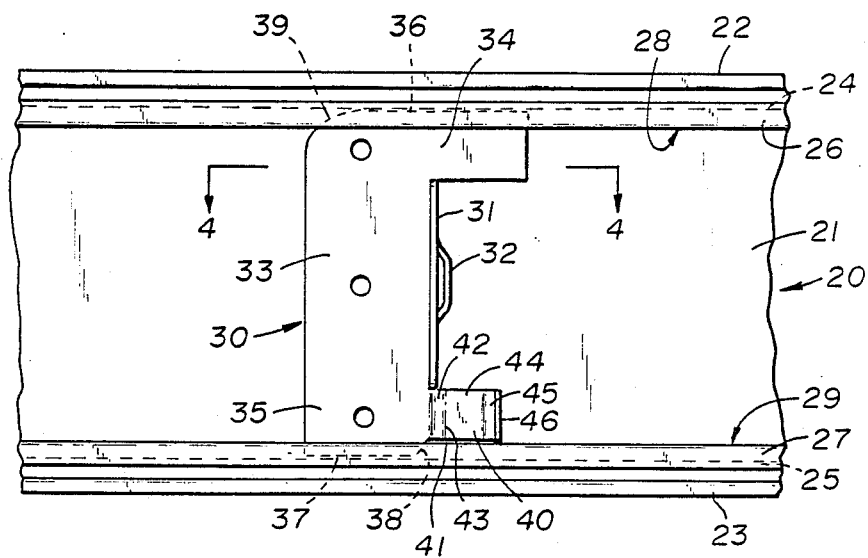
FIG. 3 is a bottom plan view of the combination of FIG. 2.
Figure 5:
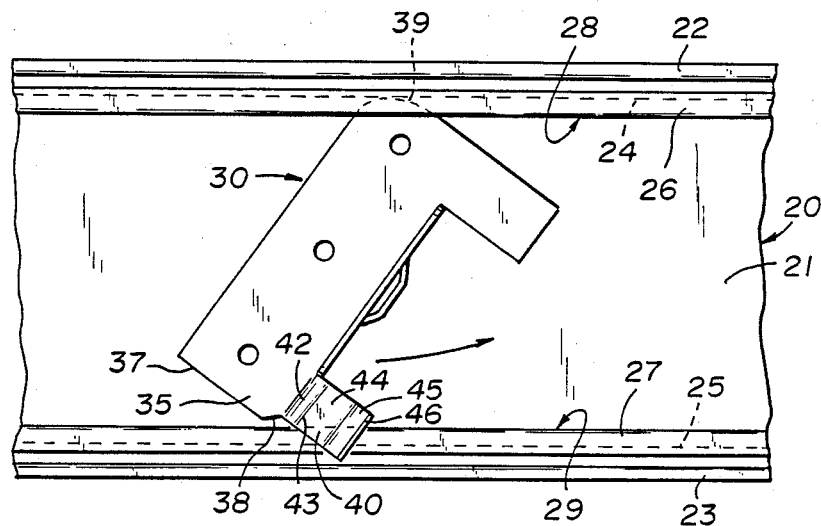
FIG. 5 is a bottom view of the stud clip while it is being pivoted into position in the top rail.

In FIG. 2, the rail 20 is shown to comprise the non-serrated, longitudinal web 21 and the parallel flanges 22 and 23 which extend at right angles from opposite edges of the web. Projecting from the web in parallel relation to the flanges 22 and 23 are the longitudinal strips 24 and 25, which are spaced apart from each other and from the flanges. The strips 24 and 25 connect the inwardly turned tracks 26 and 27, respectively, in parallel relation to the web 21 and thus define the slots 28 and 29 into which the stud clip 30 is pivoted as shown in FIG. 5. Turning again to FIG. 2, the standard 31 is shown to have the struck out fastener members 32; it is also shown to extend at a right angle from the flat plate 33 between the skids 34 and 35 which are slidable along the tracks 26 and 27. As shown in FIG. 3, the outer edges 36 and 37 of the clip 30 fit slidably between the inner surfaces of the strips 24 and 25. The shoulder 38 of the skid 35 also rests at least partially within the slot 29 but the major portion of the arcuate edge 39 of the skid 34 remains outside of the slot 28. Said shoulder 38 and arcuate edge 39 serve as alternative pivot points during the fixation of the clip 30 to the rail 20.

Figure 4:
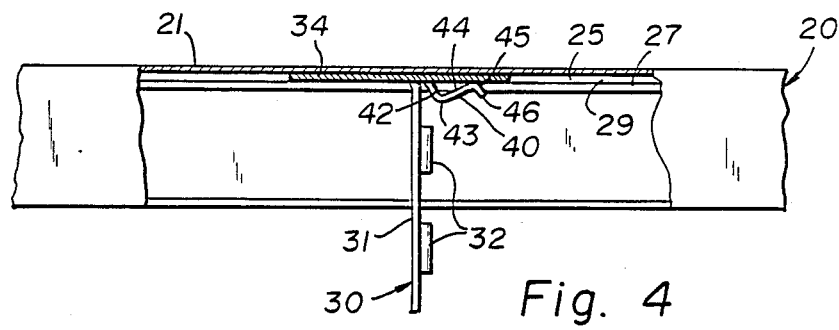
FIG. 4 is a sectional view of the combination of FIG. 3, taken along the line 4—4.

The locking tab 40 is narrower than the skid 35 and a substantial portion of it is spaced apart vertically from the plane of the skid, as is shown in FIGS. 3 and 4. Because of the inclination of the tab 40 relative to the track 27, segments of its outside edge 41 abut the track and prevent rotation of the clip 30 once the clip is in place according to this invention. The leg 42 extends at an oblique angle from the skid 35 and is connected at the knee 43 to the shank 44 which slopes back toward the web 21 where the foot 45 touches the edge of the track 27 and the glide 46 extends toward the plane of the knee 43 at an angle of about 45° from the horizontal.

In FIG. 5, the arcuate edge 39 of the clip 30 is within the slot 28 of the rail 20, the glide 46 has overridden the bottom side of the track 27 and the foot 45 rests on said bottom side. As the clip is pushed against the web 21 and twisted in the direction of the arrow, the resiliency of the tab 40 at the knee 43 allow the skid 35 to be pressed against the web 21 and the shoulder 38 to slide between the web and the track 27. Continued rotation of the clip in the horizontal plane in such direction will cause the entire edge 37 of the clip to slide into the slot 29 and the foot 45 to snap down alongside the track 27 of the rail. Further rotation of the clip in either direction is blocked by the tab 40 unless the foot 45 is pried away from the web 21 deliberately in the event that it is desired to remove the clip 30 from the rail 20 after the ends of the slots 28 and 29 have been closed off during the course of construction.

Figure 6:
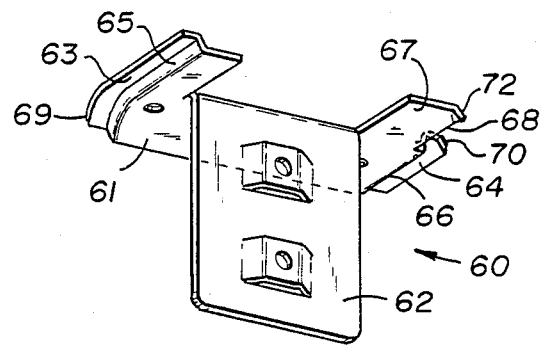
FIG. 6 is a perspective view of another embodiment of the stud clip of this invention.

In FIG. 6, the clip 60 comprises the plate 61 and the standard 62 which is sheared out from the central portion of the plate and bent to depend therefrom at a right angle. The plate 61 is spaced apart vertically from the narrow skids 63 and 64 by the walls 65 and 66, respectively. The locking tab 67 is a coplanar extension of the plate 61. Because the skid 64 and the wall 66 terminate along the line at which the tab 67 originates, the outer edge 68 of the tab is substantially co-linear with the wall 65. The rounded edge 69 of the skid 63 and the shoulder 70 at the terminus of the skid 64 and wall 66 are the leading edges of the clip 60 when it is inserted into the slots 28 and 29 of the rail 20. When the clip 60 is thus inserted, the plate 61 is spaced apart from the web 21 of the rail 20 and the walls 65 and 66, along with the outer edge 68 of the tab 67, abut the tracks 26 and 27, respectively. The outside corner of the tab 67 is bent down to form the glide 72.

The clip 16 of FIG. 1 and the clip 60 of FIG. 6 are particularly adapted for combination with the rail 12 because the central portion of the plate of each (see plate 61 of clip 60) is spaced apart vertically from the serrated web 19 of the rail 12. The rail 12 can not accommodate the clip 30 because the serrations in the web 19 would interfer with the insertion of the skids 34 and 35, which are integral and coplanar with the flat plate 33, into the slots defined by the tracks 17 and 18 of the rail 12.

It will be apparent to those skilled in the art that other modifications of the stud clip illustrated herein may be made without departing from the spirit and scope of the following claims.

The subject matter claimed, therefore is:

1. A partition system comprising:
    a channel form top rail having an elongate web, a pair of flanges depending from opposite edges of the web, and a pair of elongate tracks in a plane lower than and parallel to the web, each of which extends inwardly in relation to the flanges to form a slot between the track and the web;
    a stud; and
    a stud clip having a base plate, a standard depending at a right angle from the central portion of the plate in engagement with the stud, the remaining lateral portions of the plate being skid elements which fit within the slots of the top rail and engage the tracks thereof, and a locking tab which extends from the plate beyond the vertical plane of the standard and is in edgewise abutment with one of the tracks in the top rail;
    whereby the clip is slidable along the tracks of the rail until fastened thereto and twisting of the clip within the rail is prevented by the locking tab.

2. The system of claim 1 wherein the skid elements are in a higher plane than the central portion of the plate.

3. The system of claim 2 wherein the skid elements are located along the lateral margins of the plate.

4. The system of claim 3 wherein a wall connecting a skid element and the central portion of the plate abuts the inner edge of a track.

5. The system of claim 2 wherein the locking tab is coplanar with the central portion of the plate.

6. The system of claim 1 wherein the locking tab has segments which are in a lower plane than the plate.

7. The system of claim 6 wherein the locking tab has an oblique leg extending from the plate, a shank directed back toward the plane of the plate, and a knee connecting the leg and the shank.

8. The system of claim 7 wherein the tab has a foot at the end of the shank and a glide which is inclined toward the plane in which the knee lies.

9. A stud clip having a base plate having a generally rectangular shape, a standard sheared out of and bent at a right angle from the central portion of the plate to depend therefrom, a locking tab which extends from a lateral portion of the plate beyond the vertical plane of the standard and whose outer margin is inset from the outer margin of the plate, a shoulder between said outer margins, and an arcuate edge on the base plate generally diagonal from the shoulder; said locking tab having a portion which is bent down out of the plane of the plate.

10. The stud clip of claim 9 wherein the central portion of the plate is in a lower plane than the lateral margins thereof.

11. The stud clip of claim 9 wherein the locking tab has an oblique leg extending down from the plate, a shank inclined back toward the plane of the plate, and a knee connecting the leg and the shank.

12. The stud clip of claim 11 wherein the tab has a foot at the end of the shank and a glide which is inclined toward the plane in which the knee lies.

* * * * *